Patented Oct. 7, 1947

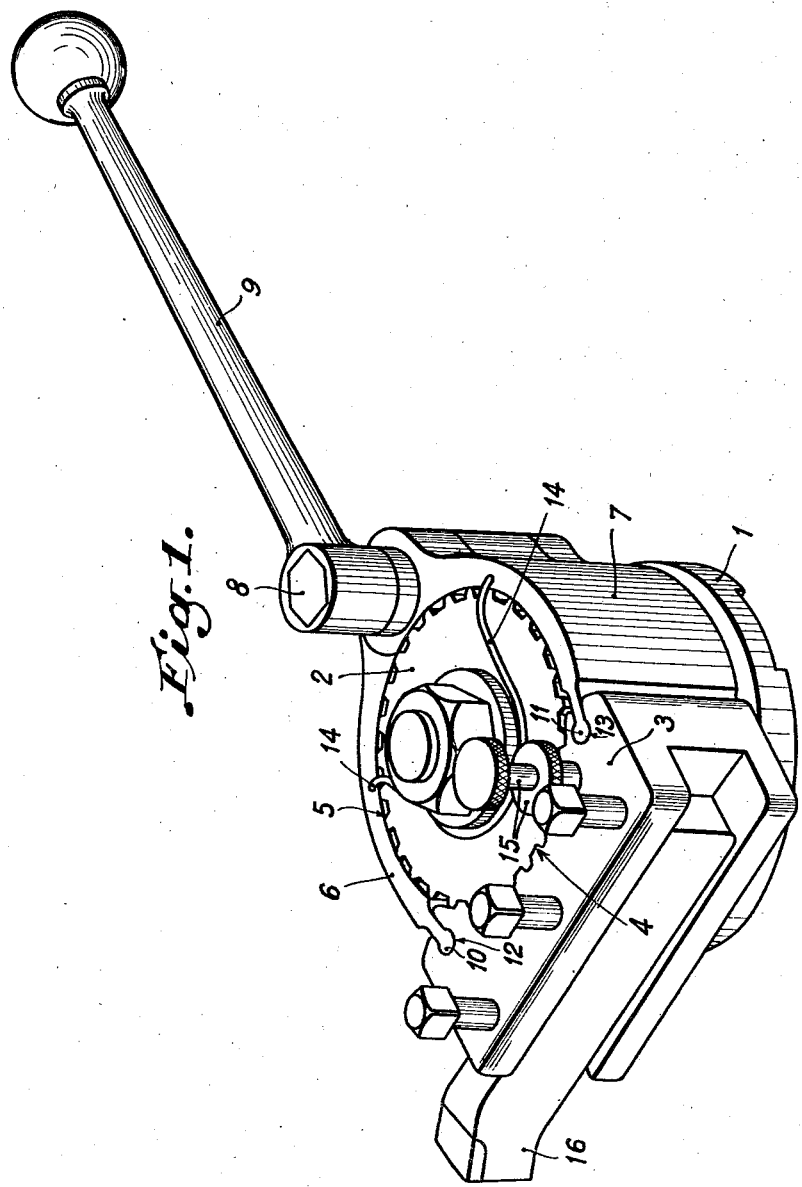

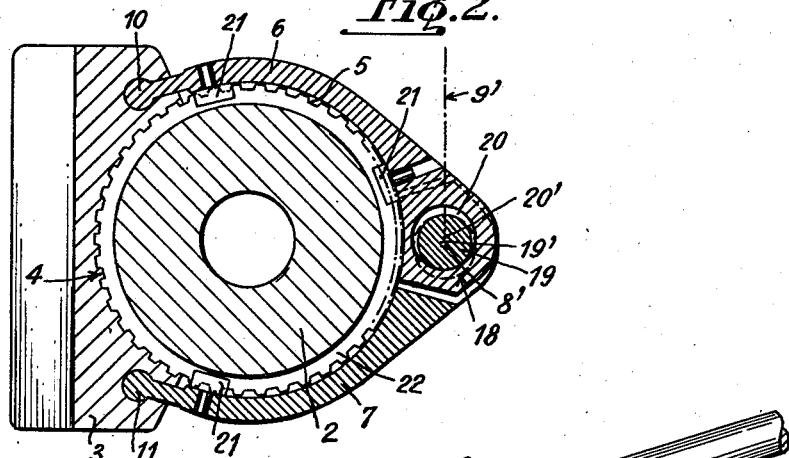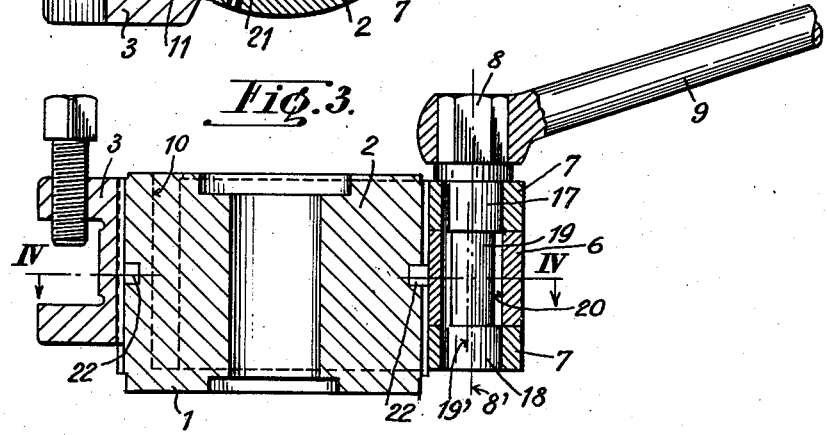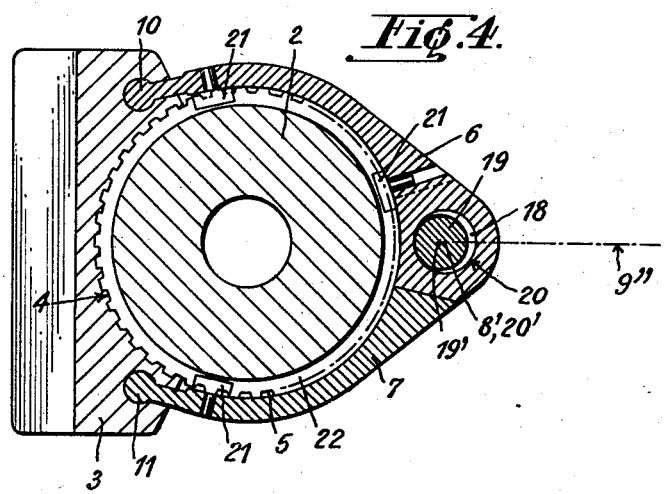

2,428,508

UNITED STATES PATENT OFFICE 2,428,508

TOOLHOLDER APPLIANCE FOR LATHES

Jacques Edouard Weigle and Jean Minder, Geneva, Switzerland

Application May 23, 1945, Serial No. 595,426 In Switzerland October 18, 1943

Section 1, Public Law 690, August 8, 1946. Patent expires October 18, 1963

4 Claims. (Cl. 82—36)

The present invention relates to a tool-holder appliance for lathes, which is characterised in that it comprises a body to be fitted on to the lathe and including a toothed capstan, in that it comprises a detachable tool-holder presenting a toothed part of a shape complementary to that of a part of the toothed periphery of the capstan, and in that it comprises means for rapidly immobilising the tool-holder in relation to the capstan, after the interlocking of the teeth and by tightening the latter in one of a number of possible relative angular positions chosen at will.

The annexed drawings represent, as an example, an embodiment of the tool-holder appliance for lathes in accordance with the invention.

In the drawings:

Figure 1 is a perspective view of the tool-holder appliance according to the invention.

Figure 2 is a horizontal section of the tool-holder illustrated in Fig. 1 in resting condition.

Figure 3 is a vertical median section through the tool-holder according to Figs. 1 and 2, in operating condition.

Figure 4 is a horizontal section made at the same level as in Fig. 2, the individual parts being in the same position as in Figure 3.

Like parts are designated by like numerals in all figures of the drawings.

The tool-holder appliance shown comprises a body 1 which fits on to the lathe (not appearing in the drawing) and includes a fixed capstan 2 with teeth round its entire periphery. It also comprises a detachable tool-holder 3 with interior teeth 4 of a shape complementary to the toothed arc 5 (360° in this case) of the capstan 2. This tool-holder 3 is, in the example shown in the drawing, a chisel-holder, the tool being shown at 16.

The appliance represented further provides means for rapidly immobilising the tool-holder 3 in relation to the capstan, these immobilising means comprising two jaws 6, 7 mounted knuckle-jointed on a shaft 8, the upper end of which is fitted with a crank-handle 9. Each of the jaws 6, 7 ends in a cylindrical boss 10, 11, respectively, fitting into slots of corresponding shape 12, 13 in the tool-holder 3. As is seen in the drawing, the jaws 6, 7 are placed round the capstan 2 and serve to keep the tool-holder 3 in the position in which its teeth are in mesh with the teeth 5 of the capstan.

The shaft 8 of the handle 9 has two cylindrical portions 17 and 18 concentric with its axis of rotation 8', and forming pivots for the jaw member 7. There is a cylindrical portion 19 between and of smaller diameter than portions 17 and 18. The axis 19' of portion 19 is eccentric with respect to axis 8'. Portion 19 is disposed in bore 20 of jaw member 6, which bore is of the same diameter as the bores of member 7 which accommodate portions 17 and 18.

Fig. 2 shows the various parts in resting position. Handle 9 is in position indicated by dash-dot line 9' and the axis 20' of bore 20 is spaced from axis 8' and the tool-holder 3 can freely slide parallel with the axis of the capstan and the teeth; this allows the holder to be almost instantaneously fitted into place, in mesh with the teeth 5, on the one hand, and with the parts 10 and 11 of the jaws 6, 7, on the other. Naturally, the tool-holder can be detached from the capstan just as rapidly.

When the handle 9 is brought from position 9' (Fig. 2) to position 9'' (Figs. 3 and 4), the axes 8' and 20' will coincide. Thereby the collar formed by the two jaws is shortened and the tool-holder 3 is firmly pressed radially against the teeth 5 of the capstan.

When the handle is returned from position 9'' to 9', the collar referred to above is extended and the jaws go back to the positions shown in Fig. 2, whereby the pressure of the tool-holder against the capstan is relieved.

The group formed by the jaws, the crank-handle 9 and its shaft freely revolves round the capstan when the tool-holder 3 has been released from the bosses 10, 11 of these jaws. This allows of regulating at will the relative angular position of the tool-holder 3 in relation to the capstan by bringing it into gear with any desired part of the toothed periphery of this capstan.

Members 21, fixed to the jaws and engaged in a circular groove 22 of the capstan prevent axial movement of the jaws with respect to the capstan.

A spring 14 placed on the capstan has ends individually connected with the jaws 6, 7 and presses the latter to the toothed periphery of the capstan i. e., holds the jaws in a position in which the distance between the bosses 10 and 11 is the same as that between the corresponding slots 12 and 13. This facilitates fitting of the tool-holder on to the capstan.

The tool-holder may have a guide-mark and the capstan a graduated scale on its upper surface, which facilitates correct relative angular positioning of the tool-holder 3 in relation to the capstan.

It can easily be understood that the appliance described offers the great advantage not only of allowing the tool-holder to be brought into varying angular positions in relation to the fixed capstan, but also of enabling a tool-holder such as the one represented to be replaced by another bearing a different tool, but it too being provided with teeth 4 and parts 12 and 13 for fitting on to the ends of the jaws. A set of an indefinite number of tool-holders could thus be made available which could be interchanged with the greatest ease and without loss of time, and this would allow of machining work-pieces in series, as for a turret-lathe, on an ordinary lathe, with the consequent advantage of an unlimited number of operations. Moreover, when a tool-holder previously used is again put on the capstan, the tool is placed in exactly the same position, which ensures very precise working. A regulating device of a current type, of the height of the tool-holder in relation to the body 1, is shown at 15.

In the example indicated in the drawing, the tool-holder 3 can occupy 28 different positions. By varying the teeth, a different number of positions can be obtained.

In a variant, the teeth of the capstan need not occupy the entire periphery of the latter.

The appliance described offers the further advantage that it can be fitted to almost all lathes without modification of the fixed supports.

What we claim is:

1. A tool-holder appliance for lathes, comprising, in combination, a body member adapted to be fitted to the lathe, said body member having a toothed cylindrical surface portion, a tool-holder having a toothed portion interfitting with the toothed portion of said body member, tightening means disposed adjacent said body member and disconnectably connected with said tool-holder, and means adapted to exert a pull on said tightening means to thereby urge said tool-holder substantially radially toward the axis of said cylindrical portion, whereby the teeth in the tool-holder are engaged with the teeth on said body member.

2. A tool-holder appliance as set forth in claim 1, said connecting means extending partly around said cylindrical surface portion and having end portions, and said tool-holder having end portions disconnectably connected with the end portions of said connecting means and being movable with respect thereto in a direction parallel to the axis of the teeth of said toothed portion.

3. A tool holder appliance as set forth in claim 1, said connecting means consisting of two jaw-like members individually surrounding a portion of said toothed surface portion and each having an end portion, said tool holder having end portions individually engaging said end portions of said jaw-like members and being slidably movable in a direction parallel to the teeth of said body member.

4. A tool-holder appliance for lathes, comprising, in combination, a body member adapted to be fitted to the lathe and having a cylindrical surface portion, teeth on said surface portion disposed parallel to the axis thereof, a tool holder having a concave cylindrical surface portion disposed concentric with and fitting around a portion of said first cylindrical surface portion and having teeth fitting between the teeth of said first surface portion, two jaw-like members, each jaw-like member surrounding a portion of said first cylindrical surface portion, a pivot member having a longitudinal axis positioned parallel to the axes of said body member and having a cylindrical portion, one of said jaw-like members being swingably mounted on said cylindrical portion, said pivot member having another cylindrical portion disposed eccentrically with respect to said first cylindrical portion, the other of said jaw-like members being swingably mounted on said other cylindrical portion whereby turning movement of said pivot member contracts and expands said jaw-like members about said body member to engage and disengage toothed portions of said body member and said tool-holder, and said tool-holder being disconnectably connected with said jaw-like members and slidingly movable with respect thereto in a direction parallel to the axes of said cylindrical surface portions.

JACQUES EDOUARD WEIGLE.
JEAN MINDER.

REFERENCES CITED

The following references are of record in the file of this patent:

UNITED STATES PATENTS

| Number | Name | Date |
|---|---|---|
| 2,366,079 | Wilson | Dec. 26, 1944 |

FOREIGN PATENTS

| Number | Country | Date |
|---|---|---|
| 293,536 | Italy | Feb. 24, 1932 |